United States Patent
Mann

(10) Patent No.: US 7,423,239 B2
(45) Date of Patent: Sep. 9, 2008

(54) LAMINATED ELEMENT PROVIDED WITH A HEATED LAYER

(75) Inventor: Detlef Mann, Gunzenhausen (DE)

(73) Assignee: Saint-Gobain Glass France, Courbevoie (FR)

( * ) Notice: Subject to any disclaimer, the term of this patent is extended or adjusted under 35 U.S.C. 154(b) by 103 days.

(21) Appl. No.: 10/558,472

(22) PCT Filed: May 26, 2004

(86) PCT No.: PCT/FR2004/001301

§ 371 (c)(1),
(2), (4) Date: Nov. 23, 2005

(87) PCT Pub. No.: WO2004/110102

PCT Pub. Date: Dec. 16, 2004

(65) Prior Publication Data

US 2006/0292380 A1    Dec. 28, 2006

(30) Foreign Application Priority Data

May 28, 2003  (DE) .................... 203 08 376 U
Aug. 6, 2003  (DE) .................... 103 35 979

(51) Int. Cl.
*B60L 1/02*    (2006.01)
(52) U.S. Cl. .............. 219/203; 219/219; 219/541; 219/543; 219/552
(58) Field of Classification Search ............ 219/541, 219/202, 200, 203, 219, 220, 522, 543, 547, 219/552, 548, 497, 494; 52/172; 439/55
See application file for complete search history.

(56) References Cited

U.S. PATENT DOCUMENTS

| 3,918,783 | A | * | 11/1975 | DuRocher et al. | 439/55 |
| 4,691,486 | A | * | 9/1987 | Niekrasz et al. | 52/172 |
| 4,782,216 | A | * | 11/1988 | Woodard | 219/547 |
| 4,786,784 | A | * | 11/1988 | Nikodem et al. | 219/543 |
| 4,918,288 | A | * | 4/1990 | Carter et al. | 219/203 |
| 5,408,069 | A | * | 4/1995 | Mischel, Jr. | 219/219 |
| 5,624,591 | A | * | 4/1997 | Di Trapani | 219/522 |
| 5,938,957 | A |   | 8/1999 | Tanahashi et al. |  |
| 6,455,809 | B1 |  | 9/2002 | Kuno et al. |  |
| 6,476,358 | B1 | * | 11/2002 | Lang et al. | 219/219 |

(Continued)

FOREIGN PATENT DOCUMENTS

DE        19860870    *   7/2000

(Continued)

OTHER PUBLICATIONS

U.S. Appl. No. 10/558,472, filed Nov. 23, 2005, Mann.

*Primary Examiner*—Tu Ba Hoang
*Assistant Examiner*—Leonid Fastovsky
(74) *Attorney, Agent, or Firm*—Oblon, Spivak, McClelland, Maier & Neustadt, P.C.

(57) ABSTRACT

A laminated panel element that includes at least two rigid panes, for example glass panes, bonded to each other on their surfaces, which are each provided, over their whole surface, with an electrically conductive coating that can be heated by application of a voltage via electrodes. One of the two rigid panes is provided with a cut-out allowing the passage of external electrical connections that are in electrical contact with the two coatings.

16 Claims, 2 Drawing Sheets

U.S. PATENT DOCUMENTS

2003/0017756 A1  1/2003  Pereira et al.
2005/0221062 A1  10/2005  Mann

FOREIGN PATENT DOCUMENTS

| | | | |
|---|---|---|---|
| EP | 0 490 723 | | 6/1992 |
| EP | 0 490 723 B1 | | 6/1992 |
| FR | 2 646 968 | | 11/1990 |
| GB | 2248160 | * | 3/1992 |

* cited by examiner

LAMINATED ELEMENT PROVIDED WITH A HEATED LAYER

FIELD OF THE INVENTION

The invention relates to a laminated panel element with a heating layer.

DISCUSSION OF THE BACKGROUND

Heater elements applied to glass or other nonconducting substrates can be used as radiative heater units if the installed heating power is adequate for this purpose. These heater elements can be installed on or in building walls or be integrated into these buildings as a replacement for the usual (central) heating units. For this purpose, they do not need to be implemented in the form of windows but can equally well be in the form of mirrors, decorative surfaces, etc. Alternatively, it is also possible for such panel elements to be used as a general means to produce heating from the surfaces of technical appliances, for example domestic appliances, where their limited installation height and smooth, easily-cleaned surfaces offer big advantages.

The power requirements of large-area heating layers demand the use of relatively high voltages. Safe and reliable electrical isolation must therefore be provided, particularly along the edges of the panel concerned, which may be coated over its whole surface.

DE-A1 198 60 870 describes a panel heater element of this type, with a glass substrate and its whole surface coated. In order to ensure safe and reliable isolation from the outside of the electrically powered coating, a region forming a frame around the periphery of the coating is isolated by a separation line and is thus electrically neutralized. Such an arrangement also protects the coating from corrosion that penetrates in from the outer edges, but that can only penetrate as far as the separation line.

The electrical connections to the heating layer are connected to the coating situated on the inside of the surface surrounded by this frame, other separation lines defining a heating current path over the whole surface of the coating. The same document also discloses the option that consists in coating with an electrical conductor two or more of the bonded panes of a laminated or safety glazing panel. The details of the practical implementation of such a laminated pane will not however be entered into here, either as regards the electrical connections or the electrical control of such a double heating layer.

In another known panel element (document DE-B-2 113 876), the electrically conductive heating coating does not extend right up to the edge of the panel, such that a spacer frame for an insulating glazing panel can be bonded, without any special arrangements, directly onto the border (where there is no layer) of the glazing panel. The electrode power supply conductors pass through sealed feed holes formed in the spacer frame. The second pane of the insulating glazing panel has a non-heating solar protection layer.

The prior patent application 102 41 728.8 of Applicant describes a connecting device for a laminated panel element that comprises a first rigid pane having a heating layer together with a second rigid pane joined over its whole surface with the first by adhesion. The connection device is inserted into a feed hole formed in one of the rigid panes. It comprises contacts that allow a direct contact with the heating layer to be established. For this purpose, the latter has at least two electrodes that are disposed in the region of said cut-out. A plurality of current paths, electrically connected in parallel and formed within the coating, can run between these electrodes.

The length and width of the current path or paths together with the surface conductivity (expressed in ohms per square) of the layer configuration used will determine the consumption of electrical energy and the heating power of the panel element. Depending on the particular power supply voltage available or predetermined, various heating powers can be established over wide ranges by the current path pattern, the maximum admissible temperature also depending on the type of use of the finished panel element. If, for example, it is not possible for the user to come into direct contact with it, or this need not be assumed, the temperatures can be well above 50° C. However, care must of course be taken to ensure that coatings adhering to the coated pane, for example adhesive layers of a laminated glazing panel, are not degraded at the temperatures that may be reached during normal operation.

In the literature, various materials are mentioned that are suitable for such heating layers. Solely as examples, indium tin oxide (ITO) and metals that are good conductors such as gold, silver, copper or aluminum are mentioned here. Layer configurations having dielectric antireflection layers and at least one metallic layer situated between them allow very good transmission of visible light with satisfactory electrical conductivity, but can also be used, at the same time, as infrared reflectors. Such typical layer configurations exhibit sheet resistances in the range of 1 to 4$\Omega$ per square.

When these heater elements operate at high heating powers, the adhesive layer, generally a thermoplastic (preferably, a PVB, PMMA or EVA sheet), can reach its thermal limits. The adhesion to the (coated) glass surfaces may fail when the full heating power is applied for a sufficiently long period. In some cases, and in particular at high current density locations, this can lead to local delaminations of the coating. Since, for reasons of production method and cost, moving away from the adhesives tried and tested over several years in laminated glass manufacturing is undesirable, other means of avoiding these thermal problems must be found.

SUMMARY OF THE INVENTION

The object of the invention consists in solving this problem by proposing a better laminated panel element with heating layers.

According to the invention, this problem is solved with the features claimed. The features of the dependent claims present advantageous developments from this subject.

Firstly, with a double coating, the option is proposed which consists in obtaining the same heating power as with a single coating without a significant increase in the heater unit volume, the layer thicknesses being in the nanometer range with a much lower current per unit area for each coating. Heat is not then produced in only one of the interface layers situated between a glass panel and the adhesive layer. Furthermore, the thermal loading of the connection electrodes, through which all the current must flow into all the current paths, is reduced. Another feature of this configuration according to the invention resides in the fact that the two coatings are electrically connected via a flat side of the panel element, owing to the fact that one of the two panels has a cut-out that allows the passage of external connections.

In a first advantageous embodiment of the invention, the two coatings are disposed on either side of the adhesive layer that joins the two rigid panes. In a second advantageous embodiment which, depending on the thickness of the rigid panes, may yield a slightly greater total thickness for the laminated panel element, a third rigid pane is provided and at least one heating layer is disposed on each side of the third rigid pane. In particular, it is not absolutely necessary that the central pane hold the two heating layers, several variant arrangements being possible, as will be explained in more detail below.

Other combinations of the two variants may also be implemented where an even greater distribution of the heating power is desired, and, if required and within the scope of the present invention, other rigid panes (coated or uncoated) may also be added.

In all the configurations, the distribution of the heating can be controlled, on the one hand if the two coatings are identical and are powered by identical supply voltages (preferably, the normal mains voltage in the country concerned (for example, 110 or 230 VAC)).

In an advantageous development, the coatings that each form one or more resistive heater elements (in parallel) can each be used separately from one another or be used in a series or in a parallel circuit.

In the latter case, the highest heating power can be obtained; the latter can be used, for example, for heating the heater element when still cold, returning to a lower heating power for the longer-term operation.

The configuration according to the inventions, however, also allows the two coatings to be provided with completely different properties. On the one hand, they may be made of different materials. Their resistances can be adjusted over wide ranges, for examples by the choice of the specific conductivity and/or of the internal structure of the layer configuration, such that different heating powers are obtained even for the same applied supply voltage.

On the other hand, the coatings may also be applied with various thicknesses. Thus, the sheet resistances can again be adjusted depending on whether the coatings of various thicknesses are formed from identical materials or from different materials.

In addition, especially in the case of transparent panel heater elements, the choice of material also allows a desired colored appearance to be obtained. For example, a gold coating has a more or less pronounced red or golden tint, whereas layers of silver have a more neutral tint.

It is clear that, in a manner known per se, on a panel element according to the invention, two or more current paths may also be provided which, if required, may be connected independently of one another, within either or both of the coatings, in order to be able to connect and disconnect the heating power in stages if needed. This will depend on the number of contacts or electrodes available on the coatings.

During the manufacture of panel heater elements not to be used as windows, the antireflection coating of the conducting layer itself, for example made of silver or another conducting metal, could be eliminated which, on the one hand, would simplify the power connections (dielectric antireflection layers are usually nonconducting or are poor conductors), and, on the other hand, would allow decorative effects to be obtained on the surface. The precise determination of suitable materials for the configuration of heating layers is however left to the discretion of those skilled in the art who have the task of calibrating the desired heating power.

As an extra feature, one or more temperature probes can be provided for detecting the effective temperature of the panel element. Such temperature probes may even be implemented in the form of current limiters (for example, cold conductors whose electrical/ohmic resistance increases with temperature). As a variant, a separate switching mechanism can be provided for disconnecting the heating power if there is a risk of overheating of the panel element, where this mechanism can be controlled by a temperature probe.

In a particularly advantageous manner, the panel element according to the invention can be equipped with a connecting device of the type described in the aforementioned prior application. It is possible to connect the two heating layers simultaneously to a single connecting device which will be disposed in the cut-out of one of the panes. The electrical connections of the heater element can thus be advantageously grouped in a very compact fashion. At the same time, the connecting element can comprise the switching elements necessary for controlling the heating power of the heater element. These are, in particular, elements for the independent control of one or both coatings, and, where required, of two or more independent current paths situated within one or both coatings, which elements allow parallel or serial connections to be established, together with, in some cases, switching elements controlled by thermoprobe. Lastly, as a safety cut-off, switching elements can be provided that are required in case of possible rupture of the glass heater element.

This connecting device has the advantage of being able to be mounted after the manufacture of the laminated panel element and also of being able to be removed from it, if needed. It is particularly preferable that the connecting device be fitted with removable contact means, for example plug or spring contacts. For relatively high supply voltages of the laminated panel element, they only have to transmit small (AC) currents; in addition, heater elements used in buildings are not, as a general rule, subject to vibrations. Thus, problems of corrosion should not be expected which, in other fields of application (vehicle manufacture), can have the effect of reducing the contact efficiency by increasing the contact resistance. Furthermore, the connection or contact area may, if necessary, be hermetically sealed in order to prevent dampness or dirt penetrating into the system.

If necessary, the electrical contacts onto the active elements or, as the case may be, onto their electrodes can, however, also be attached by soldering or only be protected as an option. Soldering techniques are known that allow the soldering points to be melted reliably without direct contact with the heat source (induction or laser soldering) or which can even be used through the coated pane without however damaging the coating.

A panel element equipped according to the invention may be used as a stand-alone heating unit. It can also be integrated into an insulating glazing panel in which it is joined to another pane via a separation frame. It is clear that other (glass) panels may also be included within a laminate joined over its whole surface to the two rigid panes of the panel heater element without, by doing this, straying from the idea on which the invention is based.

BRIEF DESCRIPTION OF THE DRAWINGS

Other details and advantages of the subject of the invention will become apparent from the figures of an exemplary embodiment and a variant embodiment and from the description which is presented in the following section.

In simplified drawings that are not to scale,

In FIG. 1, a panel heater element 1 according to the invention is fabricated in the form of a laminated glazing panel having a first rigid pane 2, an adhesive layer 3 and a second rigid pane 4. The two rigid panes 2 and 4 are preferably thermally prestressed, or partially prestressed. On their flat sides facing the adhesive layer 3, each of the two panes has a heating layer 5. Only a part of the thickness of the rigid pane 2 is shown and a double transverse dashed line on the rigid pane 4 indicates that its thickness shown has also been truncated. It will be understood that these two rigid panes are considerably thicker than the adhesive layer 3.

Figure 1:
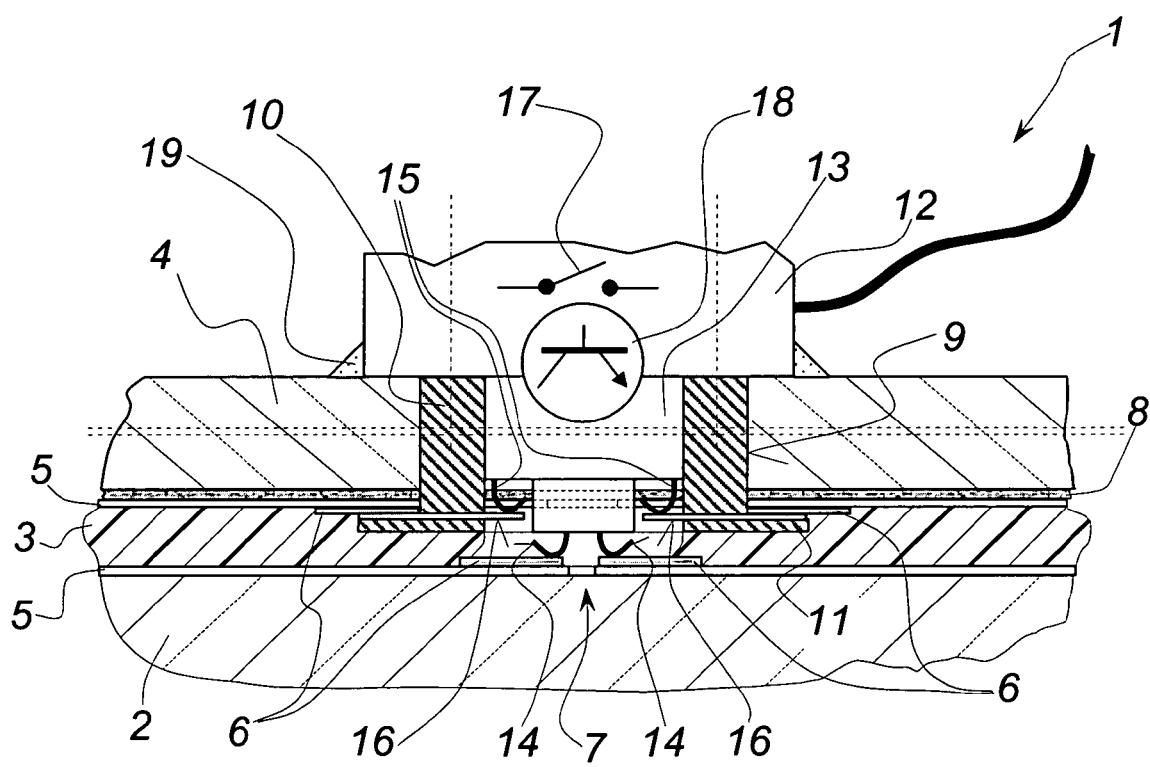
FIG. 1 shows a cross-sectional view of a laminated panel element according to the invention in the region of a connecting device, two electrical heating coatings being disposed on either side of a single adhesive layer.

The heating layers 5 consist of compositions and/or successions of layers that are sufficiently resistant to the thermal stresses when they function as surface heating layers and that are suitable for the particular application and, where required, for the pane prestressing. Suitable layer configurations have been described in numerous variants in the prior art, so that these does not need to be considered further here. Layer configurations with a high visible light transmission can be implemented that are therefore transparent.

For example, a coating marketed by the Applicant under the name of "Planitherm 1.3" can be used, where the number represents it k index. This is a layer configuration with a high thermal resistance and capable of being prestressed, having a silver layer and dielectric antireflection layers on both sides of this layer, and which also possesses infrared reflection properties.

However, depending on the requirements, other electrically conducting layer configurations may, of course, also be used. Their sheet resistance will need to be in the range from 1 to 25 ohms per square. The lower the sheet resistance, the larger can be the flat heater element that must be heated with a given voltage.

Suitable means ensure, in a manner known per se, the peripheral passivation of the coatings 5 along the edges (not shown here) of the panel element, in other words that there is no electrically conducting contact with either its outside surface or with its front surface, nor is there any risk of corrosive attack of the layer material from the outside. In any case, a hermetic covering of the border gap is obtained by means of the synthetic thermoplastic adhesive that forms the adhesive layer 3 (for example, polyvinyl butyral (PVB), ethylene/vinyl acetate (VA)). It will be understood that the adhesive layer material must be chosen to be compatible with the material of the coating 5.

The cross-sectional view shows the essential components of the electrical power supply of the two heating layers 5 in a common connection area. Each of them has (at least) two plane electrodes 6 that are disposed on both sides of an insulating separation line 7 that isolates two electrical poles of the heating layers 5 from one another. The heating layers 5, which are initially deposited continuously, are divided, in a manner known per se, into current paths by structure lines created later. This defines the current paths between the two pairs of electrodes 6, such that the current flows over the whole surface of the panel element. The current paths (not shown here) can be, but are not required to be, identical for the two coatings 5.

The electrodes 6 of the two layers 5 can also, depending on the requirements, be implemented in the same or in different ways. The same currents will not necessarily be required to flow, nor will the same heating power necessarily be expected, in both coatings 5 for all applications.

The electrodes 6 themselves are opaque and cannot be visible from the outside. Consequently, they can also be configured as decorative elements, for example representing the logo of a firm or manufacturer.

Unlike the succession of layers shown, the electrodes 6 may also be deposited under the coatings 5, in other words before their deposition onto the glass surfaces. They can take the form of thin metal foils or else as ribbons of conductive screen-printing paste that can be baked (during the prestressing of the panes). Suitable embodiments of electrodes, which are also referred to as collection rails, have been widely described in the prior art. By coloring the conductive screen-printing paste used for the electrodes, given colored effects can also be obtained.

It is clear that, where necessary, the electrical contact area can be visually masked by suitable means, for example by placing an opaque decoration underneath it or by printing such a decoration onto it, or else by using a very dark colored glass paste for the panes. As an example, in the region of the electrodes the pane 4 has an opaque coating 8 which is not electrically conducting and which was printed onto the surface of the glass before the deposition of the coating 5 and then heat treated during the prestressing process.

In the connection area of the electrodes 6, a feed hole or a cut-out 9 is formed in the pane 4 and in the adhesive layer 3. This allows the passage of the external electrical connections for the two pairs of electrodes 6 of the two coatings 5. The cut-out in the adhesive layer 3 is cut to size before the two rigid panes 2 and 4 are joined together, such that the adhesive material does not penetrate as far as the electrodes 6 by melting. Where necessary, suitable protection measures will be taken.

An insert 10 in the form of a bushing is fixed in the feed hole 9 of the pane 4. Its axial length corresponds substantially to the thickness of the rigid pane 4 (a few millimeters), and it penetrates as far as the plane of the adhesive layer 3. A radial shoulder 11 that overhangs toward the outside hooks onto the rear edge of the feed hole 9, such that the insert 10 is fixed there in geometric correspondence which prevents it being extracted.

This insert must already be in place in the feed hole 9 before joining the two rigid panes 2 and 4. Only when the thermoplastic adhesive layer 3 has melted will it be definitively fixed. It can be seen in the drawing that the shoulder 11 is further held within the material of the adhesive layer 3.

The insert 10 forms the mechanical base of a connection housing 12. Two vertical dashed lines indicate a threaded link between the two parts allowing them to be separated. A support block 13 is fitted into the center hole of the insert 10 through the connection housing 12. This forms the base of two pairs 14 14; 15, 15 of spring contacts that are pushed into contact with the electrodes 6. The inside pair 14 of spring contacts is disposed at the lower end of a short axial appendage from the support block 13. The latter has a slightly smaller diameter or periphery than the support block 13 itself. The spring contacts are placed in direct electrical conduction on the electrodes 6 of the coating 5 of the (lower) pane 2. The power supply or heating voltage is brought to the coating of the rigid pane 2 by these contacts 14.

Although the spring contacts 14 suffice, in the intended application of the surface heater element 1 (relatively high supply voltage, AC current), for the demands of a safe and durable electrical connection, if necessary, they can optionally be welded to the electrodes 6, in particular with suitable pre-applied tinning, where the required heat can preferably be supplied without contact (by induction or by laser).

The outside pair of spring contacts 15 extend from the support block 13 at the shoulder formed at the transition with its appendage. The spring contacts 15 are not in direct contact with the surface electrodes 6 of the heating layer 5 of the (upper) rigid pane 4, since the latter must terminate on either side of the feed hole 9. However, the insert 10 has two connecting bridges 16 for this purpose. On one side, they penetrate into the center hole of the insert 10. They stop on either side of the appendage of the support block 13 and form the elements that are directly complementary to the spring contacts 15. On the other side, they pass through the wall of the insert 10 and rest on either side against the (upper) surface of the shoulder 11 of the insert 10, namely the surface facing the coating 5 of the pane 4.

After the insertion and the fixing of the insert 10 into the feed hole 9 of the rigid pane 4 and after the bonding of the two rigid panes 2 and 4, the shoulder 11 holds the connecting bridges 16 in contact with the (upper) flat electrodes 6. The insert 10 is screwed into the connection housing 12. In this way, the shoulder 11 is pulled with a prestressing against the flat electrodes 6 and this contact area is not particularly critical. The surfaces of the connecting bridges 16 in contact with the flat electrodes 6 can be roughened or have points allowing a certain penetration of the connecting bridges into the flat electrodes 6. Here also, as has already been indicated above, by applying heat, additional soldering, with pretinning of the connecting bridges and/or of the flat electrodes, can however be implemented.

The connecting bridges 16 are preferably fixed into the insert 10 so that the connecting device can be assembled as easily as possible. This can be achieved, for example, by coating the connecting bridges 16 (narrow sheet-metal strips) with the synthetic material of the insert 10 during its manufacture.

The support block 13 with the spring contacts 14, 15 is inserted into the insert 10 in the correct position, if necessary by applying force with suitably fashioned elements, such that the spring contacts 14, 15 come into contact with the corresponding complementary element (electrode, bridge contact), and is then fixed. The support block 13 can form an integral assembly with the connection housing 12 and be fixed at the same time as the latter onto the insert 10. The axial and radial offset between the pairs 14 and 15 of spring contacts allow direct contacts between them to be excluded.

The circuit symbols of a switch 17 and a transistor 18 represent the electrical or electronic equipment of the support block 13 or of the connection housing 12 and may each correspond to a plurality of corresponding elements. In addition to the passage of the electrical supply voltage from the connecting cable to the electrodes 6, other control and switching functions are attributed to this part of the connecting device. In particular, these switching elements provide the voltage-controlled power supply of one or of both of the coatings depending on the corresponding instructions from the external control as was already explained above.

In the connection part, by means of the insert 10 and the support block 13, one or more temperature probes (not shown) may also be maintained in contact with one or more coated panes 2 and 4 in order to detect the effective temperature in the contact area of the electrodes 6.

A switching element can then evaluate the measured values from the temperature probe and, if necessary, disconnect, at least momentarily, the current feed to one of the heating layers or both, if the effective temperature were to exceed an acceptable threshold. However, a switching element can also be provided that protects against temperature excesses and that, in a manner known per se, limits the electrical power consumed to acceptable levels.

At least one switching device, which may have an electronic or electromechanical configuration, manages the current feed to the heating layers. This switching device may fundamentally be manually connected locally, be controlled by sensors, for example by the temperature probe, or by a window control device. As has already been indicated, the latter may be part of an automatic temperature regulation system for the premises (air conditioning installation, etc.), however it can fundamentally also be selectively controlled manually.

If the control signals are transmitted by wireless, a suitable receiver will be provided in the connection housing 8 or in the support block 13, in addition to a decoder and other switching means (for example, amplifiers). If the control signals are transmitted by lines, suitable evaluation means will be provided for these, in particular where the control signals are transmitted via already existing mains connection lines and must be filtered at their input.

In a particularly advantageous embodiment, all of the electrical devices or interfaces are thus assembled locally in the connection part of the panel heater element 1.

After the connecting device has been built and its operation verified, if necessary, the transition between the pane surface and the connection housing 12 can be further made hermetically tight by a hermetic seal 19. Unlike the embodiment shown in the drawing, this hermetic seal may, of course, be installed directly between the lower face of the connection housing 12 and the pane surface.

While the insert 10 can, in practice, be joined flush with the main surface of the rigid pane 4, the connection housing 12 will be slightly protruding from this surface. Since, in most cases, this side of the flat heater element 1 is not turned toward the observer or user in the installed position and/or is, for example, placed facing or within a wall, the visibility of the connecting device on the mask (or, alternatively, on the opaque electrode 6 serving as a decorative element) remains limited, and moreover, the risks of unauthorized or accidental handling of the connecting device are, in practice, excluded. Where an activation switch of a control unit for the connecting device needs to be provided, this will, of course, be preferably installed in an easily accessible place, for example close to the edge of the flat heater element.

Figure 2:
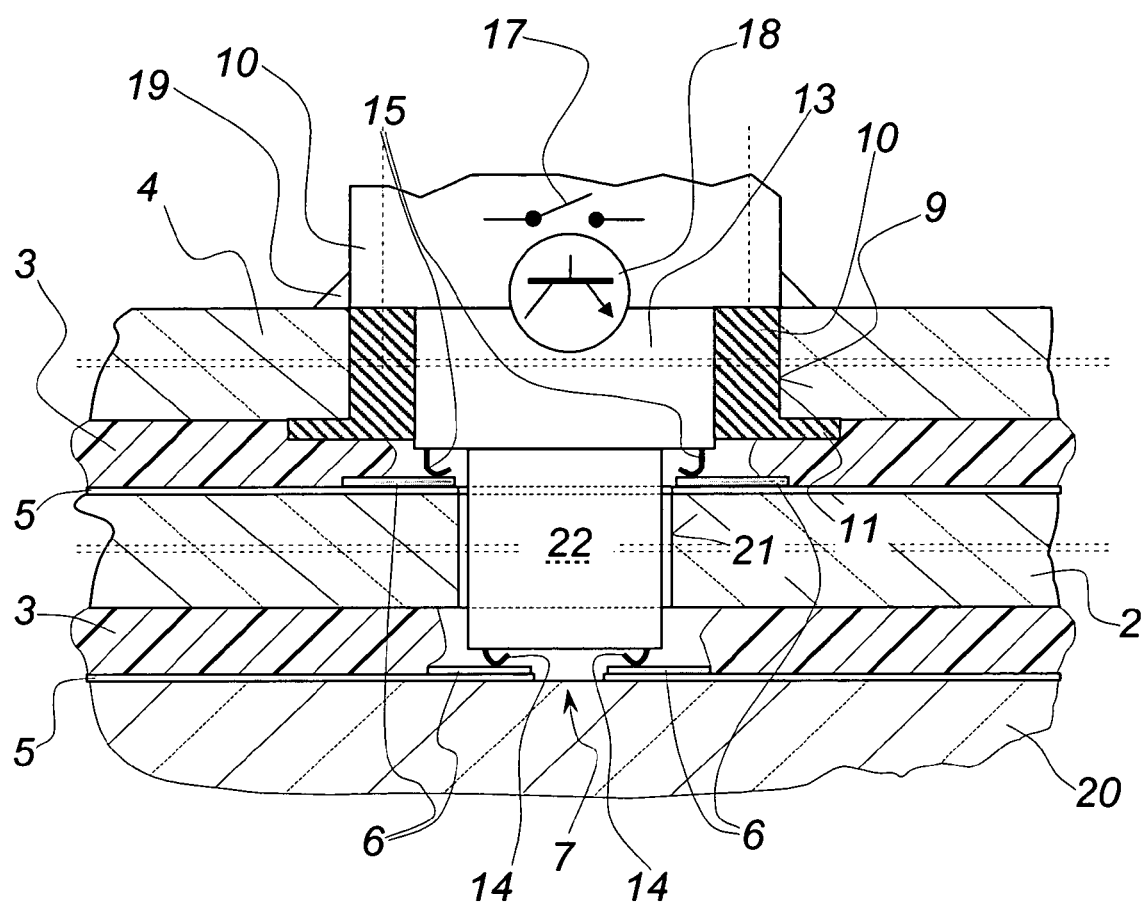
FIG. 2 shows a cross-sectional view of a variant of the laminated panel element according to the invention having a third rigid pane and two electrical heating coatings situated on either side of the central rigid panel.

In FIG. 2, identical elements to those in FIG. 1 have been given the same reference numbers. Here, the laminated panel element is equipped with a third (lower) rigid pane 20 that is joined by surface adhesion to the central rigid pane 2 by means of an adhesive layer 3. The surfaces situated at the top in the drawing of the two rigid panes 2 and 20 have a flat heating coatings 5. Once again, the two coatings 5 each have a pair of electrodes 6. The explanation presented for FIG. 1 also applies to the division of the coatings 5 and the current paths between the pair of electrodes 6, as well as to the electrical control and the operation in general.

Here also, the rigid pane 2 is crossed by a feed hole 21 that is oriented substantially axially with respect to the feed hole 9 of the rigid pane 4. The second adhesive layer 3 has a corresponding cut-out in which the electrodes 6 of the lower coating terminate. An axial extension 22 of the support block 13 is inserted into the feed hole 21 with the connection housing and the support block. Its diameter or, as the case may be, its periphery is smaller than that of the support block 13. There is a given amount of radial play between it and the wall of the feed hole 21, in order to compensate for any possible differences between the centers of the drilled holes 9 and 21 which could result from the manufacture of the laminated pane. It extends in the longitudinal direction up to just before the surface of the third pane 20 situated in the laminate. Here also, contacts between the pairs 14 and 15 of spring contacts are excluded by an axial offset and a radial offset.

The spring contacts 14 shown in FIG. 1 are disposed here at the lower end of the appendage 22 and rest on the electrodes 6 of the lower coating 5 with an adequate contact pressure. On the other hand, the spring contacts 15 again extend from the shoulder of the support block 13 formed at the transition with the appendage 22. They are situated directly on the electrodes 6 of the upper coating 5 of the central pane 2.

In another variant (not shown) of the double-layer heater, it is, or course, possible to deposit a coating 5 on the lower surface of the upper pane 4 (as shown in FIG. 1) instead of depositing it on the upper surface of the central pane 2, and to implement its contact in a manner corresponding to that of FIG. 1.

While in the configuration shown in FIG. 1 a substantially identical thermal radiation is emitted from both sides of the panel element (in the case of a completely symmetrical implementation which therefore has the same electrical power for the two coatings and the same thicknesses for the rigid panes), another arrangement of the coatings in the laminate allows an asymmetric radiation to be obtained which, if there is a need, could be wholly desirable.

In the same way, other combinations of layer arrangements, possibly with three or more heating layers, still remain within the scope of the invention described here.

The invention claimed is:

1. A laminated panel element comprising:
   at least two rigid panes bonded to each other on their surfaces, which are each provided, over their whole surface, with an electrically conductive coating that can be heated by application of a voltage via electrodes;
   wherein one of the two rigid panes is provided with a cut-out, in a connection area, allowing passage of external electrical connections that are in electrical contact with the two coatings, two surfaces of the two rigid panes facing each other are provided with electrically conductive coatings on either side of an adhesive layer that joins the panes, said cut out extends at least partially through said adhesive layer; and wherein a connecting device is located in the cut-out and is electrically connected to at least two of the electrically conductive coatings.

2. The laminated panel element as claimed in claim 1, further comprising at least a third rigid pane joined on its surface, and wherein at least one of the electrically conductive coatings is provided on both sides of the central rigid pane.

3. The laminated panel element as claimed in claim 1, wherein both or all of the coatings may be used individually selectively, within a series circuit and/or within a parallel circuit.

4. The laminated panel element as claimed in claim 1, wherein the coatings are composed of a same material and/or of a same layer configuration.

5. The laminated panel element as claimed in claim 1, wherein the coatings are composed of different materials and/or layer configurations.

6. The laminated panel element as claimed in claim 1, wherein current in at least one of the coatings always flows between two electrodes disposed within the connection area along a predetermined path that is created by a locally isolating division of the coating.

7. The laminated panel element as claimed in claim 1, further comprising a temperature probe for detecting effective temperature of the heating coatings.

8. The laminated panel element as claimed in claim 7, further comprising a switching element configured to be controlled by the temperature probe, for interruption or reduction of heating current when a predetermined temperature threshold is exceeded.

9. The laminated panel element as claimed in claim 1, wherein at least the connection area is visually covered by a mask.

10. The laminated panel element as claimed in claim 9, wherein the visual mask is obtained by use of an opaque glass paste for the prestressed pane.

11. The laminated panel element as claimed in claim 9, wherein the visual mask is formed by an opaque decoration.

12. The laminated panel element as claimed in claim 11, wherein the opaque decoration is disposed as a thin layer between the surface of the pane and the heating coating.

13. The laminated panel element as claimed in claim 1, wherein the electrodes are formed by application and heat treatment of an electrically conductive screen-printing paste before or after deposition of the heating coatings.

14. The laminated panel element as claimed in claim 13, wherein the electrodes are implemented in a form of visible decorative elements.

15. The laminated panel element as claimed in claim 1, wherein the coatings are electrically connected to the external connections by removable electrical contacts.

16. The laminated panel element as claimed in claim 15, wherein the removable electrical contacts include spring contacts.

* * * * *